(12) United States Patent
Weekers et al.

(10) Patent No.: US 7,191,541 B1
(45) Date of Patent: Mar. 20, 2007

(54) TEMPERATURE COMPENSATION SYSTEM FOR A COORDINATE MEASURING MACHINE

(75) Inventors: Wilhelmus Godefridus Weekers, East Greenwich, RI (US); Jens Hupkau, Ashaway, RI (US); David W. Payette, East Greenwich, RI (US); John Langlais, Coventry, RI (US)

(73) Assignee: Hexagon Metrology AB, Stockholm (SE)

( * ) Notice: Subject to any disclaimer, the term of this patent is extended or adjusted under 35 U.S.C. 154(b) by 0 days.

(21) Appl. No.: 11/294,784

(22) Filed: Dec. 6, 2005

(51) Int. Cl.
*G01B 5/008* (2006.01)

(52) U.S. Cl. .......................................... 33/702; 33/503

(58) Field of Classification Search ................... 33/503, 33/702, 704, 706
See application file for complete search history.

(56) References Cited

U.S. PATENT DOCUMENTS

| | | | |
|---|---|---|---|
| 3,639,993 A | 2/1972 | Sartorio | |
| 4,138,822 A | 2/1979 | Parodi | |
| 4,538,911 A | 9/1985 | Heynacher et al. | |
| 4,554,741 A * | 11/1985 | Affa | 33/702 |
| 4,564,294 A | 1/1986 | Ernst | |
| 4,694,275 A | 9/1987 | Cox | |
| 4,802,774 A | 2/1989 | Pesikov | |
| 4,882,847 A | 11/1989 | Hemmelgarn et al. | |
| 4,884,348 A | 12/1989 | Zeller et al. | |
| 4,884,889 A | 12/1989 | Beckwith, Jr. | |
| 4,910,446 A | 3/1990 | McMurtry et al. | |
| 4,939,678 A | 7/1990 | Beckwith, Jr. | |
| 4,962,591 A | 10/1990 | Zeller et al. | |
| 5,016,359 A | 5/1991 | Nagaoka et al. | |
| 5,031,331 A | 7/1991 | Herzog et al. | |
| 5,042,162 A | 8/1991 | Helms | |
| 5,092,058 A | 3/1992 | Luttmer et al. | |
| 5,172,485 A | 12/1992 | Gerhard et al. | |

(Continued)

FOREIGN PATENT DOCUMENTS

EP 0494377 B1 7/1992

(Continued)

*Primary Examiner*—G. Bradley Bennett
(74) *Attorney, Agent, or Firm*—Wolf, Greenfield & Sacks, P.C.

(57) ABSTRACT

A machine, such as a coordinate measuring machine, having a component or element movable with respect to a support structure along rails or guideways, wherein the rails have a coefficient of thermal expansion that is different from that of the support structure to which they are attached. Differential thermal expansion and contraction of the rails with respect to the support structure may be accommodated without binding or distortion of the rails by coupling each guideway to the support structure at two different points. Typically, the coupling at the first point is rigid and prevents any movement of the rail with respect to the support structure. The second coupling includes a flexible component that permits movement of the rail with respect to the support structure in a direction of movement of the element or component. This flexible component may be a leaf spring. In another embodiment, the first coupling may also be flexible. A method is also disclosed for accommodating differential thermal expansion and contraction of the rail with respect to the support structure by providing first and second couplings between the rail and support structure wherein at least the second coupling includes a flexible component that permits movement of the rail with respect to the support structure in a direction generally parallel to the direction of movement of the machine element.

10 Claims, 7 Drawing Sheets

U.S. PATENT DOCUMENTS

| | | |
|---|---|---|
| 5,173,613 A | 12/1992 | Henry et al. |
| 5,195,826 A | 3/1993 | Enderle et al. |
| 5,198,874 A | 3/1993 | Bell et al. |
| 5,333,386 A | 8/1994 | Breyer et al. |
| 5,535,524 A | 7/1996 | Carrier et al. |
| 5,555,633 A | 9/1996 | Stott |
| 5,574,381 A | 11/1996 | Andermo et al. |
| 5,594,668 A | 1/1997 | Bernhardt et al. |
| 5,610,846 A | 3/1997 | Trapet et al. |
| 5,655,311 A | 8/1997 | Affa |
| 6,049,992 A | 4/2000 | Freitag et al. |
| 6,161,298 A | 12/2000 | Bernhardt et al. |
| 6,202,316 B1 | 3/2001 | Swift et al. |
| 6,238,092 B1 | 5/2001 | Carlson |
| 6,269,546 B1 | 8/2001 | Ventura |
| 6,430,828 B1 | 8/2002 | Ulbrich |
| 6,578,283 B2 | 6/2003 | Nishi |
| 6,823,595 B1 | 11/2004 | Bellavich |
| 6,829,838 B1 | 12/2004 | Weekers et al. |
| 6,865,820 B2 | 3/2005 | Burgschat et al. |
| 7,007,397 B2 * | 3/2006 | Kodama et al. ............... 33/706 |
| 2002/0152619 A1 | 10/2002 | Ito et al. |
| 2006/0218811 A1 * | 10/2006 | Sato ........................... 33/702 |

FOREIGN PATENT DOCUMENTS

| | | |
|---|---|---|
| EP | 0537641 B1 | 4/1993 |
| EP | 0684447 A2 | 11/1995 |
| WO | WO 89/09887 | 10/1989 |
| WO | WO 89/09920 | 10/1989 |
| WO | WO 89/09921 | 10/1989 |

* cited by examiner

TEMPERATURE COMPENSATION SYSTEM FOR A COORDINATE MEASURING MACHINE

FIELD OF INVENTION

This invention relates generally to machines having an element movable along guideways, such as a coordinate measuring machine, and more particularly to coordinate measuring machines that can accommodate materials having different coefficients of thermal expansion while maintaining a high level of accuracy and stability at different temperatures.

BACKGROUND OF THE INVENTION

Coordinate measuring machines are used for dimensional inspection of workpieces, such as machined or molded parts. A workpiece typically is secured to a fixed table and a measuring probe is secured to a ram which is movable in three dimensions. To measure the position of a point on the workpiece, the probe is brought into contact with the point, and measuring scales or other sensors on the machine are read. The position of the point is typically expressed in X, Y and Z coordinates within a working volume of the machine. To measure a distance between two points, the points are contacted successively, the coordinates of both points are read, and the distance is calculated from the coordinates. State of the art coordinate measuring machines typically have features such as high resolution measuring systems, electrical contact probes, motor drives, computer controlled drives and computer acquisition and processing of data.

Two common types of coordinate measuring machines are a moving bridge machine, and a gantry style machine. In both, a bridge moves in the Y direction along guideways on a table or support. A carriage moves in the X direction along guideways on the bridge. A ram with a probe mounted on its lower end moves vertically or in the Z direction through bearings in the carriage. Thus, three-dimensional movement of the probe is provided. The scales associated with each of the movable elements indicate the positions of the movable elements in the three axial directions.

The accuracy of a coordinate measuring machine is limited by geometric errors, such as inaccuracies in the scales or other measuring devices, and faults in the guideways or other elements which define machine motion. These inaccuracies can cause measurement errors when the machine is operated at a reference temperature, which is usually 20° C. One known approach to increasing accuracy with respect to the geometric errors is to improve the construction techniques and to reduce tolerances of the system so that errors are reduced. However, reduction of errors becomes progressively more expensive as required accuracies increase. Another known approach is direct measurement of coordinate errors at points throughout the machine working volume. This approach is impractical because of a huge amount of data which must be stored for large machines and because of the time required to measure such data. In one example, U.S. Pat. No. 4,884,348 discloses a testing device for determining measurement errors.

A third known approach is the measurement of errors in parametric form. As noted, a coordinate machine typically has three sets of guideways which establish probe motion. Ideally, movement along each of these guideways should result only in linear motion, and a scale reading should equal the linear displacement. In reality, however, there are scale errors and the guideways are not completely straight or perfectly free from twists. For such a machine, there are six degrees of freedom which produce errors during movement along each guideway. For each direction of movement, there are three linear errors, $D_X$, $D_Y$ and $D_Z$ and three rotational errors $A_X$, $A_Y$ and $A_Z$. The six error parameter is measured at a number of points along each direction of machine movement, resulting in an error matrix with 18 error parameters. From the matrix of 18 error parameters, the error at any point in the measurement volume is calculated and stored. The calculated errors are then subtracted from the measured coordinate values to determine actual workpiece coordinates. Examples of this approach are found in U.S. Pat. Nos. 4,884,889 and 4,939,678.

In addition to the above mentioned so-called geometric errors, the accuracy of a coordinate measuring machine is in general also affected by thermally induced errors that may cause deformation of machine components. These are errors resulting from thermal expansion, or differential thermal expansion, due to differing coefficients of thermal expansion of different machine components. It is well known that these measurement errors may be minimized by maintaining a coordinate measuring machine at a constant temperature to prevent changes in size of the various components due to thermal expansion or contraction. However, it is not always possible to maintain the environment surrounding a coordinate measuring machine at a constant temperature. This is particularly true in a shop environment where temperatures and humidity conditions will change from season to season and day to day.

In a manner that is analogous to the correction of geometric errors, the thermal errors can be minimized either by applying appropriate design techniques or by using software error compensation techniques. The latter method is based on taking real-time readings from temperature sensors mounted on the measuring machine and the use of a model that resides inside the machine's controller. The model relates the sensor readings to geometric deformations caused by temperature changes. Correction values for the scale readings are calculated to offset these errors.

In the former method, various construction techniques may be used, such as employing materials with low coefficients of thermal expansion, or materials which all have the same coefficient of thermal expansion. Examples of such construction techniques are found in the following patents and applications: U.S. Pat. Nos. 4,538,911; 5,173,613; 5,198,874; 4,962,591; and 5,031,331; and Publication Nos. WO 89/09920 and WO 89/09887.

It is not always practical to make all components of the same material, or materials having the same coefficients of thermal expansion, since each component serves a different function and therefore should have properties that are different from other components. For example, it is desirable that the bridge be strong, but not necessarily heavy so that the bridge has a relatively low inertia. On the other hand, the guideways upon which the bridge and ram travel must be strong and formed of a material such as steel which provides a precision pathway. If the bridge were made of steel like the guideways, it would be too heavy to be of practical use and likely would be too expensive.

Most known prior art systems for fully temperature compensating a coordinate measuring machine are relatively complex and expensive. Therefore, it is desirable to have a coordinate measuring machine which can be used in various temperature environments and formed of materials of different coefficients of thermal expansion, and yet still possess a very high level of accuracy without the need for an expensive thermal compensation system.

SUMMARY OF INVENTION

This invention relates generally to machines having two elements movable with respect to one another along guideways such as rails, and to the compensation of thermally-induced errors that may cause deformation of components of the machines as a result of temperature changes, because of differences in the coefficient of thermal expansion. This invention has particular applicability to coordinate measuring machines.

In one aspect, this invention discloses a machine that comprises a movable machine component. The machine also comprises a rail along which the machine component is permitted to move in a first generally linear direction and on which the machine component rests. The machine also includes a support for supporting the rail and a first coupling between the rail and support and a second coupling between the rail and the support. The second coupling is flexible in a direction generally parallel to the first direction to permit movement of the rail with respect to the support in the first direction. The second coupling is generally rigid in directions generally perpendicular to the first direction. This minimizes movement of the rail in the directions generally perpendicular to the first direction with respect to the support. This also maintains the rail in a generally fixed relationship with respect to the support in the directions generally perpendicular to the first direction.

In yet another further aspect, a method is disclosed of accommodating differential thermal expansion and contraction between a rail, upon which a machine component rides, and a support for supporting the rail. The rail extends in a first generally linear direction to allow movement of the machine component in the first direction. The method comprises attaching the rail to the support at one location using a first coupling. The method also comprises attaching the rail to the support at a second location spaced from the first location using a second coupling. The second coupling is flexible in a direction generally parallel to the first direction. The second coupling is generally rigid in directions generally perpendicular to the first direction to maintain a substantial fixed relationship between the rail and the support in the directions generally perpendicular to the first direction.

BRIEF DESCRIPTION OF DRAWINGS

The objects, advantages and features of this invention will be more clearly appreciated from the following detailed description, when taken in conjunction with the accompanying drawings, in which.

DETAILED DESCRIPTION

This invention relates to machines having an element, such as a carriage, that moves along guideways, such as rails. This invention is directed to minimizing thermal errors in such machines by applying design techniques that make the machine or components of the machine more or less insensitive to changes in the thermal environment. This invention does not deal with geometric errors at reference temperature. Thus, the machines must still be calibrated at the reference temperature. However, this invention eliminates or minimizes the need for complex thermal error compensation.

The various aspects of this invention offset or accommodate differential expansion and contraction of one portion of the machine with respect to another portion with changes in temperature. In one aspect, the guideways or rails on which the element rides rest on a beam or support which has a coefficient of thermal expansion different from that of the rails. Members, such as bars, are employed to balance the thermal stresses produced on the beam by the rails caused by differential expansion or contraction of the beam with respect to the rails to minimize any bending of the beam. In another aspect, a pin supporting the beam at one end rides in an elongated slot on the slides that ride on a rail on which the beam moves to accommodate expansion and contraction of the beam in its lengthwise direction with changes in temperature. In yet another aspect, a flexible coupling connects the element or carriage to slides riding on the rails carrying the carriage to accommodate expansion and contraction of the carriage with changes in temperature. The present invention has particular applicability to coordinate measuring machines, such as a gantry style or moving bridge type coordinate measuring machine.

Figure 1:
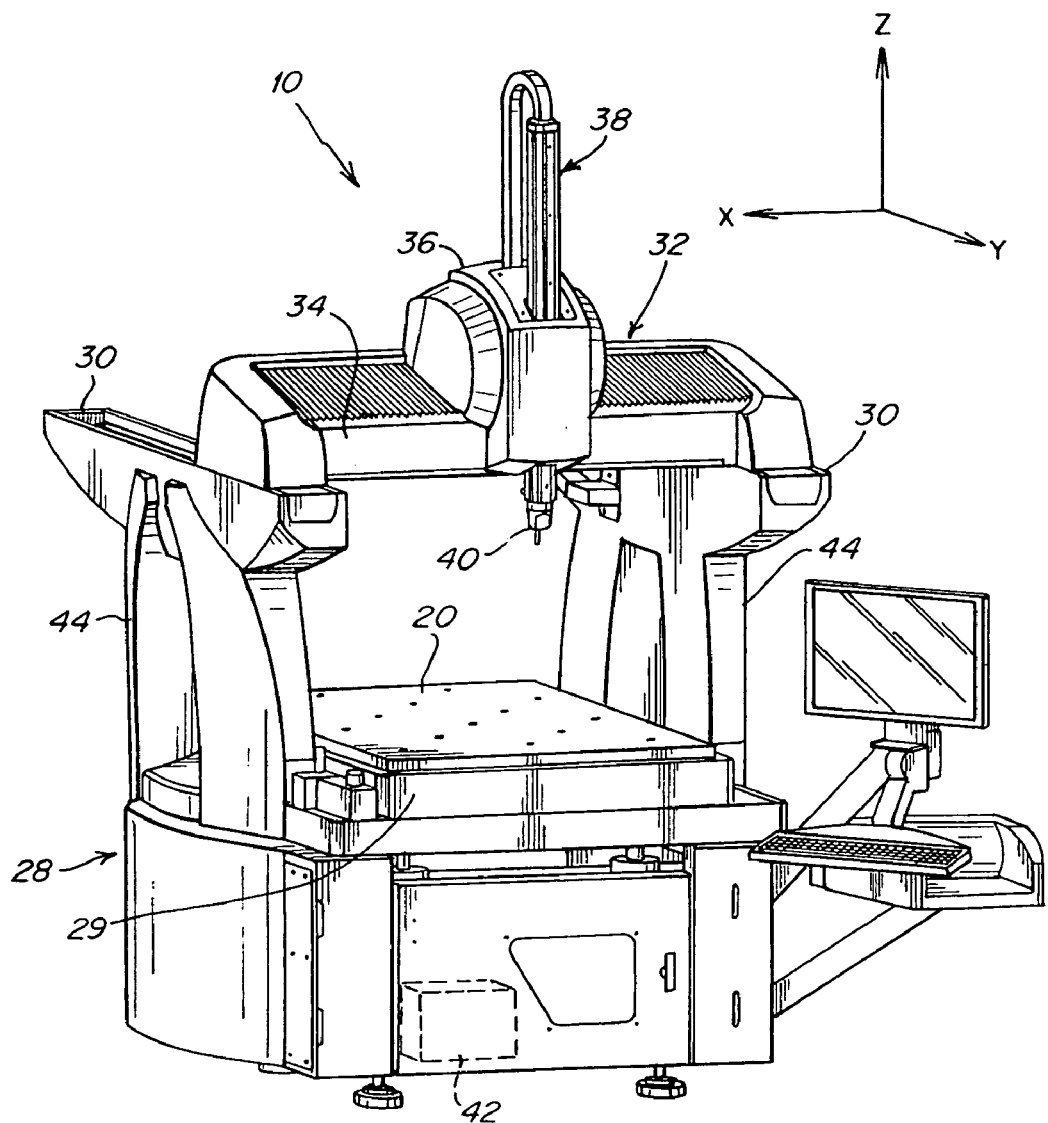
FIG. 1 is a perspective view of one embodiment of a gantry style coordinate measuring machine embodying the temperature compensation system of the present invention.

One example of a gantry style coordinate measuring machine 10 in accordance with the present invention is illustrated in FIG. 1. Machine 10 includes a table 20 for holding a workpiece (not shown) for measurement, table support structure 29, machine stand 28, two spaced, parallel Y axis assemblies 30, a bridge 32 which rides along Y axis assemblies 30, an X axis assembly 34 disposed on bridge 32, a carriage 36 which rides along X axis assembly 34, and a Z ram 38 which is carried by and movable with respect to carriage 36. Disposed at the distal end of Z ram 38 is a probe 40 for measuring a workpiece disposed on table 20. A controller 42 or the like may be provided for control of coordinate measuring machine 10.

In the embodiment of FIG. 1, each Y axis assembly 30 may be supported by posts 44 that are ultimately supported by machine stand 28. Typically, although not necessarily, table support structure 29 is provided with a vibration isolation system (not shown) such as in machine stand 28, and conventional leveling devices for maintenance of accuracy. Each Y axis assembly 30 includes guideways, such as rails 92 or the like (FIG. 8) along which bearing slides 112 (FIG. 6) on which bridge 32 travels. Bearing slides 112 may be roller bearings or air bearings or other conventional bearing systems. Each Y axis assembly 30 also includes conventional scales 96 (FIG. 8) and a drive mechanism 94 (FIG. 8), for moving bridge 32 back and forth along its associated rails in the Y direction.

Figure 2:
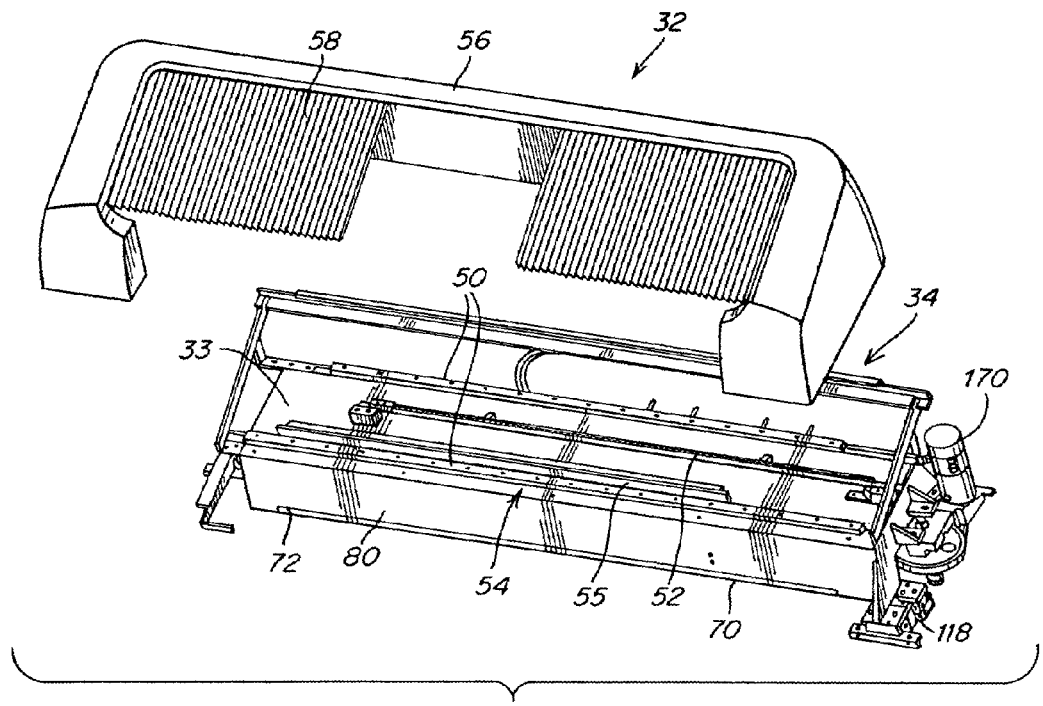
FIG. 2 is an exploded, perspective view of a portion of the bridge of the machine of FIG. 1.

Bridge 32 will now be described with particular reference to FIG. 2. Bridge 32 includes a beam 80, which provides support for X axis assembly 34 which is disposed on upper surface 33 of beam 80. X axis assembly 34 includes at least one guideway or rail 50, and more typically two rails 50, along which carriage 36 travels. X axis assembly 34 also typically includes conventional scales 52 for measuring the position of carriage 36 with respect to the X direction, and a drive 54 for moving carriage 36 along rails 50 in the X direction. Drive 54 is conventional, and may be any drive, known to be used for coordinate measuring machines. In one embodiment, drive 54 may include drive rack 55 disposed on X axis assembly 34 and a pinion gear and associated drive motor 150 (FIG. 7) on carriage 36. Scales 52 also are conventional, and may be any type of scales known to be used for this application. Rails 50 are secured tightly to beam 32, such as by screws, epoxy or the like. Typically, although not necessarily, a cover 56 with associated bellows 58 covers and provides protection for rails 50, scales 52 and drive 54 on beam 80.

Figure 3:
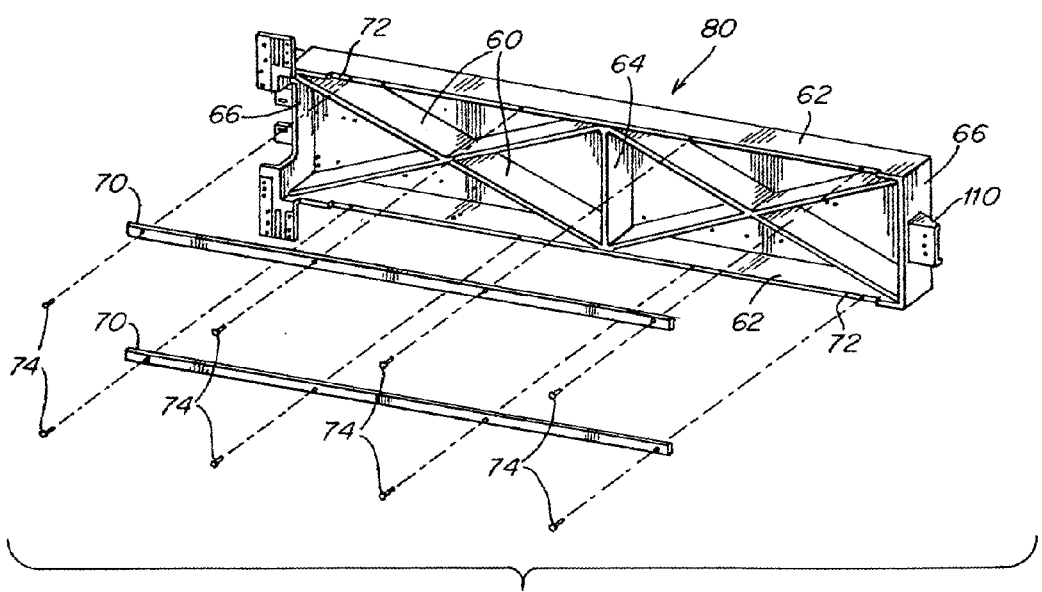
FIG. 3 is a perspective view of a portion of the bridge of FIG. 2 taken from the lower surface thereof.

Beam 80 is further illustrated in FIG. 3. It is understood that the particular design and construction of beam 80 as described with respect to FIG. 3 is only illustrative of the types of beams that could be used in this application. The particular structure, configuration and composition of beam 80 is not in any way an important or necessary feature of the invention.

In this particular embodiment, beam 80 typically is a casting formed of a metal matrix. In one example, beam 80 is formed of a matrix comprising 70% aluminum and 30% silicon carbide. The structure of beam 80 typically is open, and may include ribs 60 extending between end plates 66 and a cross support 64, as well as between sidewalls 62. Upper surface 33 covers the top of beam 80. This particular structure provides the desired strength, as well as a desired lightness, to enable rapid movement of bridge 32 from one location to another in the Y direction, while reducing inertia forces that could cause overshooting, slowness or stress on the Y axis assembly 30. In addition, beam 80 has the strength and rigidity sufficient to support carriage 36 and Z ram 38 with minimal bending or deformation which could impair accuracy. It is to be understood, however, that any other suitable design may be used for bridge 32.

Typically, rails 50, which are mounted on upper surface 33 of beam 80, are formed of a material that is different from that of beam 80, and that has a coefficient of thermal expansion that is different from that of beam 80. Rails 50 preferably are formed of a material which is sufficiently hard and strong to withstand movement of carriage 36 therealong at frequent intervals and over an extended period of time, and which can be machined to the precision necessary for the high accuracy measurements for which machine 10 is designed. Moreover, rails 50 should be formed of a material which is not subject to excessive deformation or change in size due to changes in humidity or temperature. One suitable material for rails 50 is steel, and in particular, a high carbon steel.

Figure 3A:
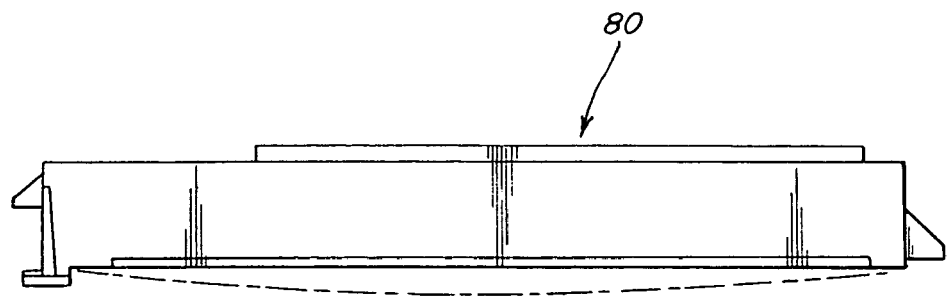
FIG. 3A is a side, elevation view of a portion of the bridge of FIG. 2, illustrating in phantom in exaggerated form bending that occurs without the invention.

For the particular exemplary structure described above, the coefficient of thermal expansion for beam 80 is about 14.0 to about 14.5 parts per million per degree Celsius (ppm/° C.). On the other hand, the coefficient of thermal expansion for rails 50 is about 11.0 ppm/° C. In this particular exemplary structure, it has been observed that for a change in temperature of from 20° C. to 30° C., beam 32 is displaced about 8 micrometers at its center as compared to its ends, resulting in a curved deformation, or X-pitch of about 60 micro-radians in which the ends of beam 80 curve upwardly with respect to the middle to produce a beam 80 shape that is concave facing upwardly or in a positive Z direction. (See FIG. 3A which illustrates such bending in phantom in an exaggerated form). This particular displacement or X pitch is unacceptable for most measuring applications. This deformation of beam 80 is a result of the fact that the material of beam 80 expands at a greater rate than does the material of rails 50. As beam 80 expands in a lengthwise direction, its expansion is restrained to a certain extent by rails 50 which are attached thereto and which do not lengthen at the same rate. Since rails 50 are securely bonded to beam 32, the resulting thermal stress on beam 80 produces the noted curvature of beam 80.

To minimize such deformation, in one aspect of the invention, at least one member, such as a bar 70, is mounted on beam 80. In one embodiment, there is one bar 70 associated with each rail 50. Typically, the bar 70 associated with each rail 50 is disposed on an opposite side of the neutral axis 79 of beam 80 from its associated rail 50, although bar 70 could be on the same side of the neutral axis 79 of beam 80 under certain conditions. The neutral axis 79 of beam 80 is an imaginary line which passes through the center of mass of beam 80 in the X direction. Also, typically, but not necessarily, each bar 70 is in general alignment with its associated rail 50 in the Y direction. Bars 70 also typically, but not necessarily, are aligned generally parallel to their associated rails 50 and are of about the same length in the X direction as their associated rails 50. The purpose of bars 70 is to offset or balance the thermal stresses produced by rails 50 with a change in temperature to minimize bending of beam 80.

For bars 70 to perform the function of balancing the thermal stresses on beam 80, there are at least four variables that must be considered. The first variable is the coefficient of thermal expansion of bars 70. The greater the differential in coefficient of thermal expansion between that of bar 70 and that of beam 80, the greater is the amount of offsetting stress produced by bar 70 for a given change in temperature. In this embodiment, where the rails 50 and the bar 70 are located on opposite sides of neutral axis 79 of beam 80, both the rails 50 and the bars 70 have coefficients of thermal expansion that are both either greater or less than the coefficient of thermal expansion of the beam 80. Where the coefficient of thermal expansion of beam 80 is between those of the rails 50 and the bar 70, the rails 50 and bar 70 should typically be located on the same side of the neutral axis of beam 80 for the applied thermal stresses on beam 80 to be balancing, or offsetting. The second variable is the stiffness of bar 70. The greater the stiffness of bar 70, the greater is the ability of bar 70 to offset or balance the thermal stresses produced by rails 50 and vice versa. Another variable is the cross-sectional area of bar 70. All other factors being the same, the greater the cross-sectional area of bar 70, the greater is the offsetting stress produced by bar 70 with a change in temperature, and vice versa. Finally, another variable is the distance of bar 70 from the neutral axis 79 of beam 80. The greater the spacing of bar 70 from the neutral axis, the greater is the amount of balancing or offsetting stress produced by the bar, while the closer bar 70 is to the neutral axis, the smaller is the offsetting or balancing stress produced by bar 70 on beam 80.

Any bar 70 would be suitable which substantially balances the thermal stresses produced on beam 80 by rails 50 to minimize any bending of beam 80. It is apparent from the foregoing analysis that the combination of the coefficient of thermal expansion of the material chosen for bar 70, the stiffness of the material chosen for bar 70, the cross-sectional area of bar 70, and the spacing of bar 70 from the neutral axis can be varied or changed almost infinitely through a wide range. Thus, a bar 70 that balances the thermal stresses can have an almost infinite number of different combinations of these four variables. Changes in one or more of these variables can be offset by changes in one or more of the other variables and the same balancing effect can be achieved. For example, assuming that the coefficient of thermal expansion of beam 80 is greater than that of both rails 50 and bar 70, a material having a much higher coefficient of thermal expansion than that for rails 50 may be chosen for bar 70 and this higher coefficient of thermal expansion may be offset by changing the cross-sectional area of bar 70 to still balance thermal stresses, all other factors being the same. Similarly, a bar having stiffness greater than that of rails 50 may be chosen and the thermal stresses still may be balanced either by reducing the distance of the bar 70 from the neutral axis to reduce the moment arm of bar 70, or by reducing the cross-neutral area of the bar 70.

In one embodiment, one solution which is easy to implement is to select a bar 70 which is formed of substantially the same material as rails 50, and which therefore has substantially the same coefficient of thermal expansion and stiffness as rail 50. In this particular embodiment, typically the cross-sectional area of each bar 70 is the same as that of associated rail 50, and the spacing of bar 70 from the neutral axis is also the same or substantially the same as that of associated bar 50 on the other side of the neutral axis. It is to be understood, however, that the invention is not limited to this particular, simplified embodiment of the invention.

Figure 3B:
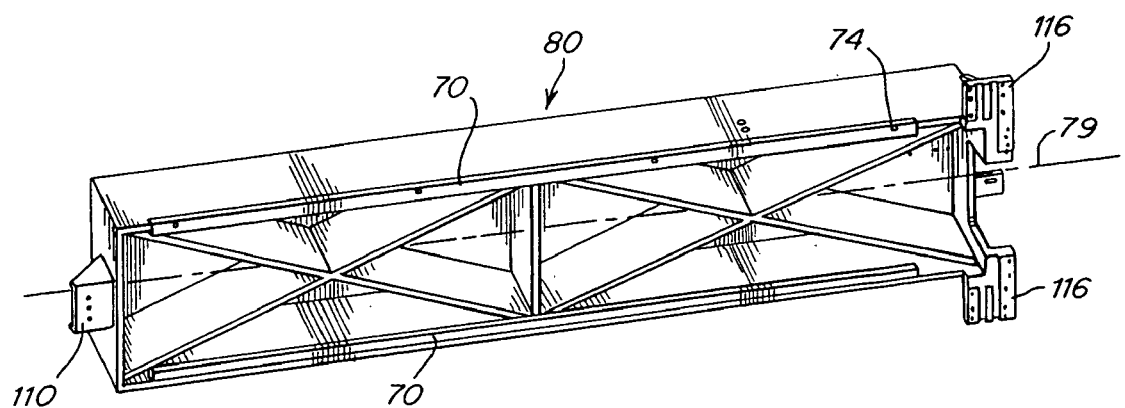
FIG. 3B is a perspective view of a portion of the bridge of FIG. 2 taken along the lower surface thereof and illustrating another embodiment of the invention.

In the particular embodiment illustrated in FIG. 3, there is one bar 70 disposed on each sidewall 62 of beam 80 at a location spaced from upper surface 33 (FIG. 2) of beam 80, generally opposite an associated rail 50 with respect to the X direction and, on the other side of the neutral axis 79 in the Z direction from its associated rail 50. In the embodiment of FIG. 3, each bar 70 is disposed on a lower edge of sidewall 62. As shown in FIG. 3, typically, although not necessarily, cutouts 72 are provided in the lower edges of sidewalls 62 to accommodate bars 70. In one embodiment, the exposed surface of each bar 70 is flush or generally flush with the lower edge of associated sidewall 62. In another embodiment, as illustrated in FIG. 3B, at least one bar 70 may be mounted on an inside surface of its associated sidewall 62, and not on a lower edge thereof. In the embodiment of FIG. 3B, no cutout 72 is necessary.

Regardless of where they are attached, bars 70 typically are firmly affixed to beam 80 to minimize any movement of bars 70 with respect to beam 80 with changes in temperature. In one embodiment, bars 70 are affixed to beam 80 using an epoxy with a very small coefficient of thermal expansion at the temperatures at which machine 10 operates. In another embodiment, bars 70 are affixed to beam 80 using screws 74, rivets or other like fixation devices. In another embodiment, both screws 74 and a layer of an epoxy are utilized to bond bars 70 to beam 32.

Figure 4:
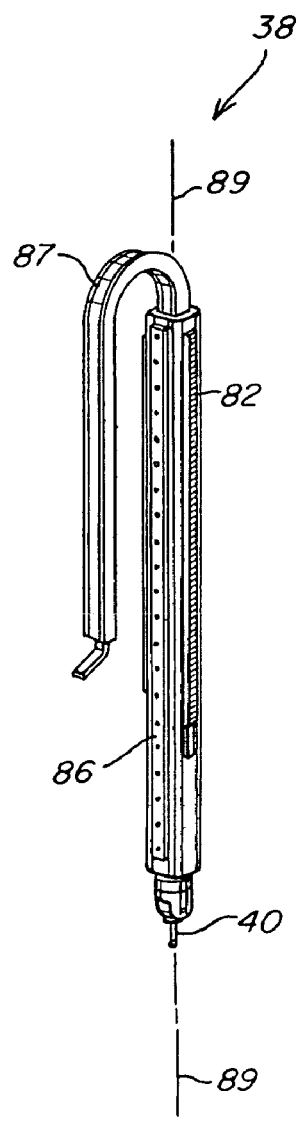
FIG. 4 is a perspective view of the Z ram of FIG. 1 taken from the backside.
Figure 5:
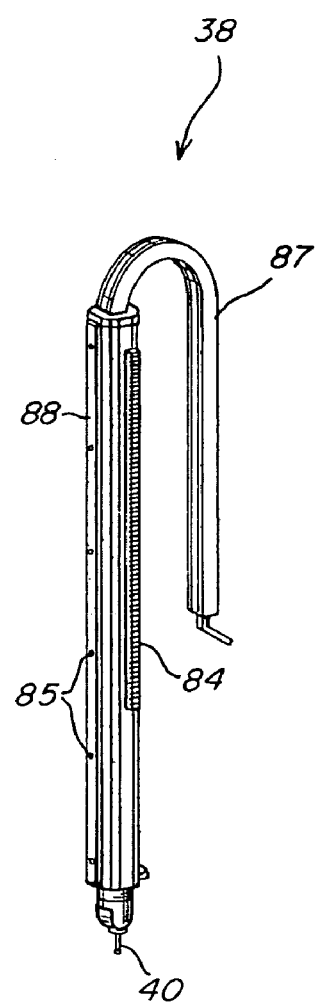
FIG. 5 is a perspective view of the Z ram of FIG. 1 taken from the front side.

Z ram 38 will now be described with particular reference to FIGS. 4 and 5. Z ram 38 moves in a direction generally parallel to its length, or in a Z direction, with respect to carriage 36. Typically, although not necessarily, Z ram 38 is a casting or an extrusion formed of the same material as beam 80, namely, a metal matrix formed of about 70% aluminum and 30% silicon carbide. It is to be understood, of course, that other suitable materials may be utilized, including pure aluminum, titanium or other light-weight but strong metals. Z ram 38 typically but not necessarily is hollow in cross-section and provides the desired combination of strength, rigidity and light weight. Z ram 38 includes conventional scales 82 disposed on one outer surface thereof for measuring the position of ram 38 and thus probe 40 in the Z direction. Ram 38 also typically includes a rack 84 extending in the Z direction and disposed on another surface thereof for coupling to, for example, a pinion gear driven by a motor 160 (FIG. 7), in carriage 36 for controlled movement of Z ram 38 in a vertical or Z direction. A cable 87 extends from an upper end of ram 38 and is electrically coupled through carriage 36 to a power source, and to other portions of the machine, such as controller 42. Disposed on one side of Z ram 38, such as a back side facing carriage 36, or facing beam 80, is a guideway or rail 86 which extends in the Z direction and which rides along bearings (not shown) in carriage 36 to guide movement of ram 38 in a vertical or Z direction in a manner well-known to those of skill in the art. Rail 86 is conventional, and the bearings (not shown) are also conventional, and may be either air bearings, or roller bearing slides or the like. Typically, rail 86 is formed of the same material as rails 50, although it need not be.

If Z ram 38, like beam 80, is formed of material having a coefficient of thermal expansion different from that of rail 86 mounted thereto, like beam 80, Z ram 38 is prone to bending when temperature changes occur. For example, for a change in temperature of 20° C. to 30° C., for a Z ram 38 formed of metal matrix composed of 70% aluminum and 30% silicon carbide, in which the Z ram has a coefficient of thermal expansion of about 14.5 ppm/° C., and for a rail 86 formed of steel and having a coefficient of thermal expansion of about 11 ppm/° C., a Z pitch of 120 micro-radians was observed. Such a Z pitch was produced by about 50 micrometers of displacement of Z ram 38 at its ends caused by the differential expansion of Z ram 38 and rail 86. More particularly, Z ram 38 expanded at a greater rate than rail 86, producing a curved shape in ram 38 which was concave on a side facing rail 86 and convex along the opposite side of Z ram 38. Such a curvature is undesirable, since significant measurement errors could result from the altered position of probe 40 or from binding of ram 38 by rail 86 within carriage 36.

As with beam 80, such bending due to differential expansion of ram 38 and rail 86 may be minimized by the provision of a member such as bar 88. Like bar 70, bar 88 balances the thermal stress produced in ram 38 by the differential expansion of ram 38 and rail 86. Bar 88 is subject to the same considerations as bars 70 and the selection of the proper materials, size and location of bar 88 results from consideration of the distance from the neutral axis 89, the cross-sectional area, the stiffness and the coefficient of thermal expansion of bar 88. For the Z ram 38, the neutral axis 89 typically extends in the Z direction or parallel to its length through about the geometric center of ram 38. In one embodiment, where ram 38 has a generally square or rectangular cross-sectional shape, bar 88 is disposed on an outer surface of Z ram 38 directly opposite the outer surface of ram 38 on which rail 86 is disposed and bar 88 extends generally parallel to and is generally coextensive with rail 86 in the Z direction. Since ram 38 is typically generally symmetrically disposed about its neutral axis 89, this configuration positions bar 88 about the same distance from the neutral axis 89 of Z ram 38 as rail 86 on the opposite side of ram 38 from rail 86. Also, typically, but not necessarily, bar 88 is formed of the same material as rail 86, and/or has the same coefficient of thermal expansion as rail 86. Also, typically, bar 88 has the same cross-sectional dimension as rail 86, so that bar 88 expands at substantially the same rate and in the same direction as rail 86. As with bars 70, bar 88 may have a coefficient of thermal expansion, stiffness, spacing from the neutral axis 89 and a size and shape different from that of rail 86, so long as the net effect of bar 88 is to balance the thermal stresses produced by the differential expansion of ram 38 and rail 86. Also, multiple bars 88 may be used. It has been observed that by the provision of bar 88 of this invention, the bending of ram 38 is substantially reduced to zero for a temperature change of from 20° C. to 30° C. Like bars 70, bar 88 typically is firmly attached to Z ram 38, such as by the use of an epoxy or by screws 85, or both. Also, bar 88 need not be the same length as rail 86, but could be shorter or longer. Moreover, bar 88 need not be positioned exactly opposite rail 86 on ram 38, but could be offset in the X direction on ram 38 with respect to rail 86.

Figure 8:
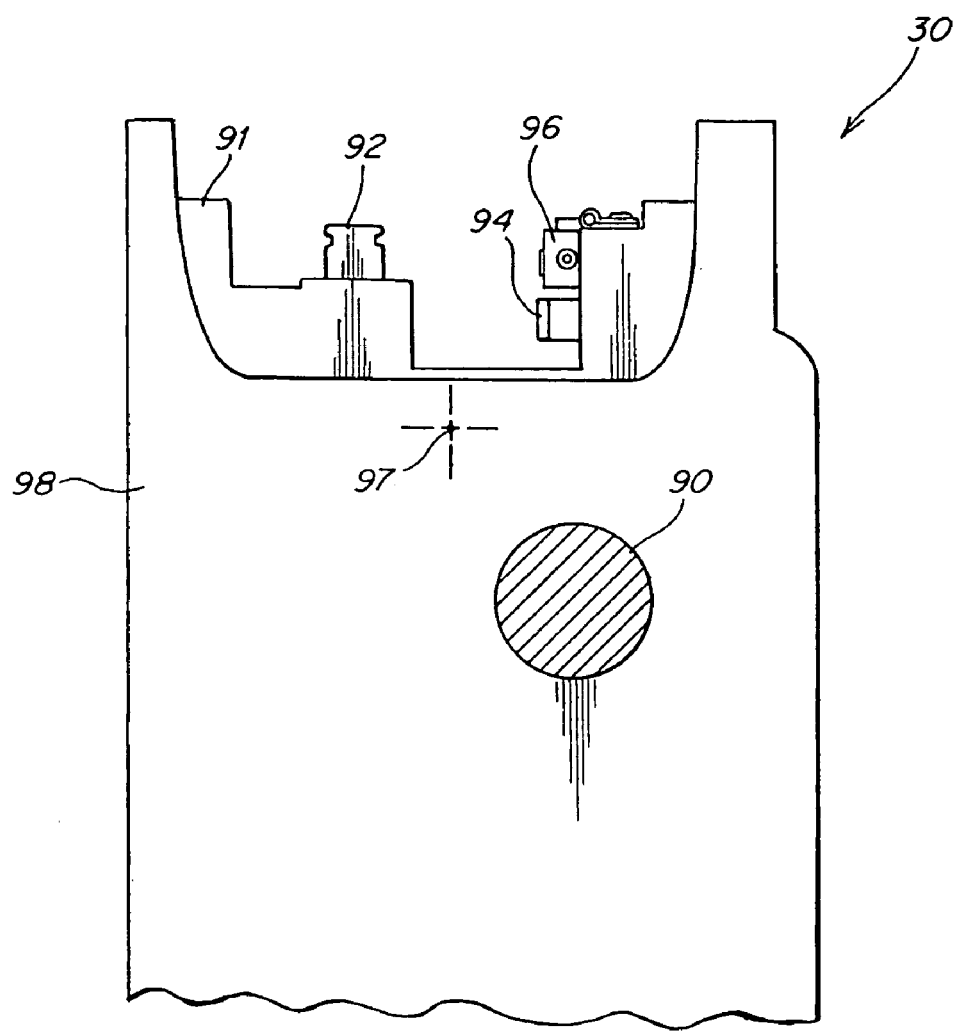
FIG. 8 is a fragmentary, cross-sectional view of one of the Y axis assemblies illustrating another embodiment of the present invention.

Another aspect of the invention will now be described with particular reference to FIG. 8. Typically, Y axis assembly 30 is sufficiently rigid and has sufficient strength to withstand any bending caused by differential thermal expansion of the Y rail 92, and its associated supporting structure 98, which is typically made of polymer concrete. However, in some embodiments, in which the underlying support 98 is less rigid and therefore more susceptible to bending with temperature variations, it is understood that a member 90 like bar 70 or bar 88 could be used in conjunction with the Y axis assembly 30.

The Y axis assembly 30 may include a Y rail 92 mounted on a Y-rail bed 91 which in turn rests on a support 98. It is to be understood that each Y axis assembly 30 is substantially identical for purposes of this invention. Y rail 92 is, in most significant respects, substantially identical to rails 50, and is typically formed of a material that is not subject to excessive deformation or change in size due to changes in humidity and temperature. Like rails 50, one suitable material for rail 92 is steel, and in particular a high carbon steel. Like rails 50, rail 92 typically is formed of a material which is different from that forming support 98, and typically has a coefficient of thermal expansion which is less than that of support 98. Support 98 may be a casting or the like, and may be formed of the same material as beam 80. Support 98 may be formed of other suitable materials, so long as such materials are sufficiently strong to support beam 80 and its associated carriage 36. As noted previously, typically Y axis assembly 30 also includes known scales 96 for measuring the position of beam 80 along Y axis assembly 30, and a known suitable drive, such as drive rack 94 which may be engaged by a suitable drive mechanism (not shown) on beam 80 such as a pinion gear driven by a motor or the like (not shown). Rack 94 and scales 96 are conventional are not part of this invention, and therefore will not be further described.

Because of the differing coefficients of thermal expansion for support 98 and rail 92, deformation of rail 92 is a possibility with changes in temperature for the same reasons as discussed previously with respect to rails 50 and 88. While typically support 98 is more massive than beam 80 or Z ram 38, and therefore somewhat less prone to deformation due to changes in temperature, deformation of structure 98, and thus bending of rail 92 producing a Y pitch is a possibility. Moreover, it has also been observed that deformation of support 98 and rail 92 about an axis substantially parallel to the Z axis is also a possibility. Such deformation could produce bending of rail 92 such that rail 92 has either a convex or concave shape facing in an X direction. For the reasons discussed above with respect to rails 50 and 88, such deformation is highly undesirable because inaccuracies in measurement can be produced, or stresses in the system may be produced which could either slow down the measurement process or cause damage.

To minimize any such deformations of Y rail 92 which could produce movement of the ends of rail 92 with respect to the center thereof in a Z direction, a member 90 is provided to substantially balance any thermally induced stresses produced by changes in temperature. As with bars 70, the coefficient of thermal expansion of member 90, the stiffness of member 90, the cross-sectional area of member 90, and the distance of member 90 from the neutral axis 97 of support 98 in a Z direction should be chosen so as to balance the thermal stresses produced by rail 92 on support 98 to minimize any bending of support 98, and rail 92. In one example, as shown in FIG. 8, member 90 is disposed on the opposite side of the neutral axis 97 of support 98 in a Z direction from rail 92. However, as previously discussed, depending upon the value chosen for the coefficients of thermal expansion of member 90 and rail 92, member 90 could be disposed on the same side of neutral axis 97 as rail 92 in the Z direction. In the example shown in FIG. 8, typically member 90 extends substantially parallel to rail 92 in the Y direction, and is substantially coextensive with rail 92. Also, typically, member 90 is spaced from neutral axis 97 the same distance in the Z direction as rail 92. Also, member 90 may be formed of the same material as rail 92, or a material having the same coefficient of thermal expansion as rail 92, and may be provided with substantially the same stiffness and cross-sectional area as rail 92.

In another embodiment of this aspect, it has been discovered that a single member 90 may also balance thermally induced stresses which tend to produce movement of the ends of rail 92 with respect to its center in the X direction, resulting in a curvature of rail 92 about the Z axis, producing concave or convex deformation of rail 92 with respect to the X direction. In this embodiment, the spacing of member 90 from the neutral axis 97 in the X direction, the stiffness of member 90, the coefficient of thermal expansion of member 90 and the cross-sectional area of member 90 are all chosen to balance thermally induced stresses which tend to produce curvature of rail 92 in the X direction, as discussed above. In the example shown in FIG. 8, member 90 is spaced from the neutral axis 97 in the X direction approximately the same distance as rail 92 is spaced from neutral axis 97 in the X direction, but member 90 is on the opposite side of disposed neutral axis 97 from rail 92. As with bars 70 and 88, depending on the coefficients of thermal expansion of member 90 and rail 92, member 90 and rail 92 could be on the same side of the neutral axis 97.

It is to be understood that two members 90 may be provided, one member 90 for offsetting thermal stresses which tend to produce curvature of rail 92 in which the ends of rail 92 extend upwardly in the Z direction with respect to its center, and a second member 90 for offsetting thermal stresses which tend to produce curvature of rail 92 in which the ends of rail 92 are offset with respect to its center in the X direction. It should also be understood, that while member 90 is shown as having a circular cross-sectional shape, any other suitable cross-sectional shape may be employed so long as the desired balancing effect is achieved. Finally, while member 90 is shown as being substantially embedded within support 98, it need not be embedded within support 98, and could be disposed at any other suitable location and affixed in any other suitable way which produces the desired result. In most other respects, the same factors which govern the selection of the size, shape and selection of material of bars 70 and 88, also govern the size, shape and selection of material for member 90.

Another embodiment for accommodating differential thermal expansion and contraction between each Y rail 92 and its underlying support 98 will now be described with reference to FIGS. 9 and 10. Like numbers are used for like parts where appropriate. In the illustrative embodiment of FIGS. 9 and 10, typically Y rail 92 is mounted onto support 98 of the machine by two axially spaced couplings, coupling 95 and coupling 101.

In one embodiment, each Y-rail 92 may be directly coupled by couplings 95 and 101 to underlying support 98, which in turn is supported by posts 44. In another embodiment, as illustrated in FIGS. 9 and 10, each rail 92 is mounted on a support beam 93, which in turn is coupled to support 98 by couplings 94 and 101. Couplings 95 and 101 both support the full weight of rail 92, support beam 93, bridge 32 and carriage 36. Both couplings maintain a substantially fixed, spaced relationship between support 98 and support beam 93. Support beam 93 is preferably sufficiently rigid that a substantially fixed, spaced relationship is maintained between rail 92 and support 98.

Figure 9:
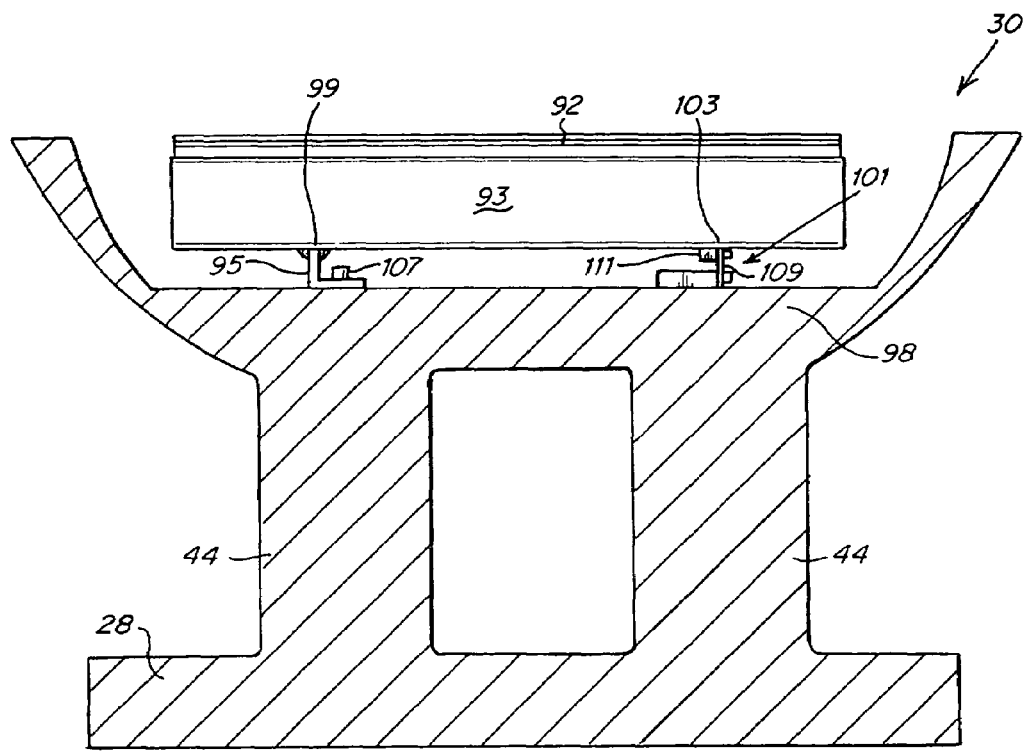
FIG. 9 is a partial, cross sectional view of an alternative Y-axis assembly with rails mounted to a support by a flexible coupling and a rigid coupling.
Figure 10:
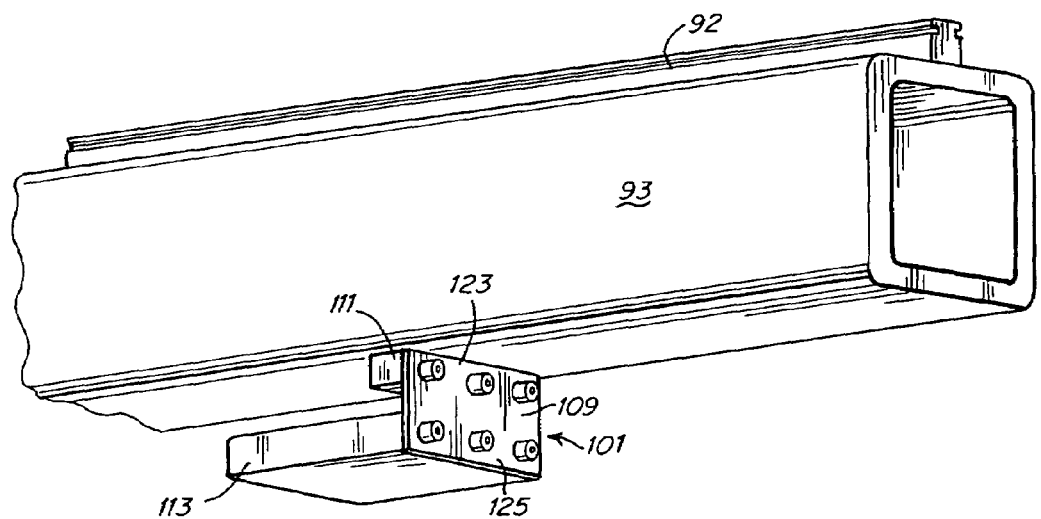
FIG. 10 is a perspective view of the flexible coupling, support beam and a rail of the embodiment shown in FIG. 9.

In the embodiment of FIGS. 9 and 10, coupling 95 connects support 98 to beam 93 at a first location 99 and coupling 101 connects support 98 to beam 93 at a second location 103 that is linearly spaced from first location 99 in the direction of the Y axis. Coupling 95 typically is rigid and firmly anchors support beam 93 and Y rail 92 to support 98 at first location 99. Coupling 95 typically provides a rigid connection between support beam 93 and support 98 in all three axes, so that no movement of support beam 93 and thus rail 92 is permitted with respect to support 98.

As shown in FIG. 9, coupling 95 may include an angle iron that is secured to the support 98 such as, for example, with threaded fasteners 107 and to the support beam 93 such as, for example, with welds, although other suitable means for connecting the components can be used, such as rivets, adhesives, and the like.

Coupling 101, on the other hand, is flexible in the Y-axis direction and allows the support beam 93 and Y rail 92 to expand or move relative to support 98 along the Y axis. Preferably, no movement of support beam 93 and thus rail 92 is permitted by coupling 101 in the X or Z axis directions. However, it is to be appreciated that flexing or movement of the flexible coupling 101 in the Y direction may be accompanied by insubstantial and acceptable excursions in the Z direction due to the geometrical configuration of coupling 101. In one embodiment, coupling 101 includes a leaf spring 109. Leaf spring 109 is constructed to resist deformation, like buckling or bending in the Z-axis direction and is stiff enough to fully support the weight and inertial loads of the support beam 93 and rail 92 in combination with coupling 95. However, leaf spring 109 is sufficiently flexible to accommodate relative movement between support 98 and support beam 93 in the Y axis direction, such as that caused by differential thermal expansion or contraction. Typically, leaf spring 109 is substantially planar in the Z-axis direction. Spring 109, in one embodiment, may be mounted along an upper planar edge 123 to a block 111 that is affixed, such as by welding or bolting to support beam 93. A lower edge 125 of leaf spring 109 may be similarly mounted to a block 113 that is, in turn, fastened to the support beam 93 such as by the use of screws, rivets, bolts, adhesives, welds, or the like. In one example leaf spring 109 may be formed of spring steel and have a thickness of about 1 mm in the Y-axis direction and a size of about 110 mm in the Z-axis direction by 63 mm in the X-axis direction, although other materials, sizes and thicknesses may be used.

The embodiment of FIG. 9 prevents undesirable deformation of the Y rail 92 by allowing the support beam 93 and Y rail 92 to expand or contract relative to support 98 in a guided manner along the Y axis. Allowing expansion and contraction to occur prevents development of thermally induced stresses between the support beam 93 and support 98, which could lead to undesirable bowing of rail 92.

Support beam 93 may provide additional stiffness and support for Y rail 92. In this manner, beam 93 may help prevent bending of Y rail 92 due to the weight or inertial loads of the bridge 32, carriage 36, and Z-ram 38 as they move about the machine. Support beam 93 and Y rail 92 preferably are constructed of materials having the same coefficients of thermal expansion to prevent deformation of Y rail 92 caused by differential expansion and contraction of Y rail 92 and support beam 93. In the illustrated embodiment, rail 92 is made of steel and support beam 93 comprises about a 4"×4" square, hollow steel beam with a wall thickness of about ¼", although other suitable materials and shapes may also be used. For example, support beam 93 may be solid.

In another embodiment of the invention, it will be appreciated that coupling 95 may also be a flexible coupling, like coupling 101. Coupling 95, in this alternative embodiment, may have a structure substantially identical to that of coupling 101 to permit movement of rail 92 in the Y axis direction with respect to support 98 while preventing any substantial movement of Y rail 92 in directions perpendicular to the Y axis direction to maintain a substantially fixed spacing between Y rail 92 and support 98. In this way, additional differential thermal expansion and contraction of Y rail 92 with respect to support 98 may be accommodated at coupling 95 as well as at coupling 101.

FIGS. 9 and 10 illustrate only one Y axis assembly 30 of the machine. It is to be appreciated that second vertical support may include a similar arrangement, as aspects of the invention are not limited in this regard. Similarly, although other aspects of the invention are not illustrated in FIGS. 9 and 10, it is to be appreciated that these aspects of FIGS. 9 and 10 may be used in combination with any others described herein.

As discussed above, beam 80 will expand and contract in a lengthwise direction, or in an X direction, as shown in FIG. 1, or in a direction generally perpendicular to its direction of movement along Y axis assembly 30, with changes in temperature. The amount of this change in length is dependent upon the particular materials of which beam 80 is composed, and upon the specific coefficient of thermal expansion of those materials, as well as upon the amount of temperature change. Thus, changes in temperature could produce movement of the ends of beam 80 with respect to the rails upon which beam 80 rides in Y axis assembly 30 in a direction perpendicular to the direction of elongation of the rails of Y axis assembly 30. If slides 112 are firmly attached to beam 80, this change in length could cause internal stresses in and binding of the slides 112 with respect to the Y axis rails upon which beam 80 rides, causing inaccuracies and delays in the measuring process, as the movement of carriage 32 would be slowed and somewhat constrained due to increased friction. Under extreme conditions, such expansion or contraction could cause permanent damage to machine 10.

Figure 6:
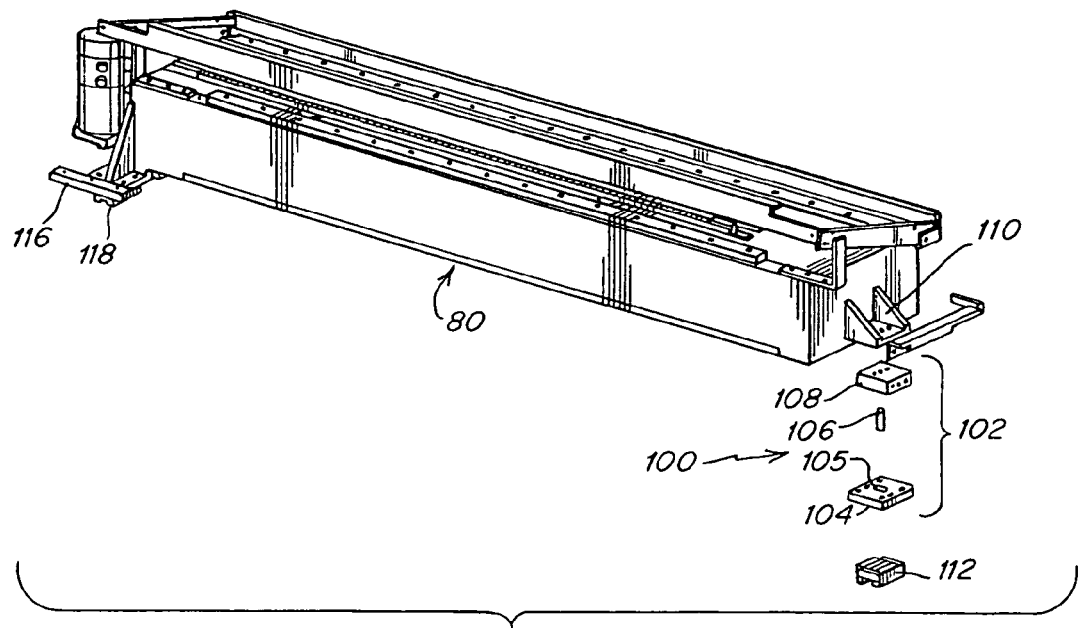
FIG. 6 is a partial, exploded, perspective view of the beam of FIG. 1 illustrating another embodiment of the present invention.

With specific reference now to FIG. 6, another aspect of this invention will be discussed in which this particular expansion and contraction of beam 80 with changes in temperature may be accommodated. Expansion system 100 includes a coupling 102 which accommodates linear contraction and expansion of beam 80 in the X direction with respect to Y axis assembly 30. Typically, although not necessarily, coupling 102 is disposed only at one end of beam 80. However, there could be a coupling 102 located at both ends of beam 80. In one embodiment, coupling 102 includes a plate 104 having an elongated hole or slot 105, which is elongated in the X direction, and a pin 106. Pin 106 rides in slot 105 of plate 104. Pin 106 is coupled to beam 80, such as, for example, by a pin mount 108 which is in turn coupled to a bracket 110 which is mounted onto beam 80. Plate 104 typically is mounted onto or is a part of, slide 112 which rides on the rails (not shown) of Y axis assembly 30. In this embodiment, beam 80 merely rests on slide 112 and is not otherwise affixed thereto, except by pin 106 which is free to ride within elongated slot 105 in plate 104 in the X direction so as to accommodate expansion and contraction of beam 80. The weight of bridge 32 and carriage 36 keeps beam 80 in contact with slide 112 and keeps pin 106 in slot 105. The width of slot 105 in the Y direction is only slightly greater than the width in the Y direction of pin 106 to prevent any movement of beam 80 in the Y direction with respect to slide 112 to permit accurate and controlled movement of bridge 32 in the Y direction.

Typically, although not necessarily, the other end of beam 80 includes one or two or more brackets 116 which are fixedly mounted to beam 80 and which in turn are fixedly mounted onto associated slides 118 which ride along the rails of the other Y axis assembly 30. It is to be understood, however, that one bracket 116 and one slide 118, or more than two brackets 116 and slides 118 may be provided.

Figure 7:
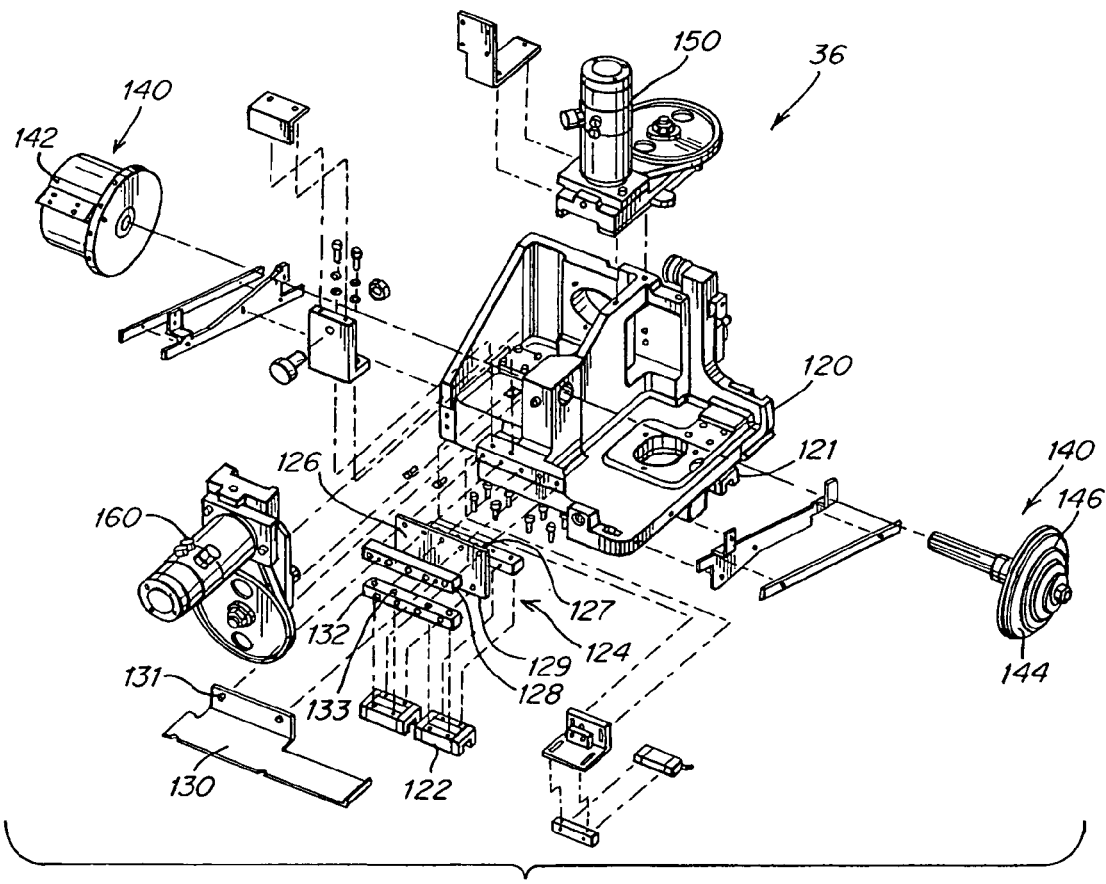
FIG. 7 is a fragmentary, exploded, perspective view of the carriage of FIG. 1 illustrating yet another embodiment of the present invention.

Another aspect of this invention will now be described with particular reference to FIG. 7. As previously indicated, carriage 36 rides along rails 50 of X axis assembly 34. Carriage 36 includes a base 120 which is coupled to slides 121 and 122 which in turn ride on rails 50. Slides 121 and 122 are conventional and could include roller bearings or air bearings, as is known in the art.

As noted above, carriage 36 also carries Z ram 38. Z ram 38 typically is provided with a counterbalance 140 as is conventional with coordinate measuring machines. Counterbalance 140 balances the gravitational force on the Z ram 38 producing a substantially weightless and smooth movement of Z ram 38 in a Z or vertical direction. One example of a suitable counterbalance 140 is a coiled spring counterbalance. Counterbalance 140 typically includes a coiled spring 142 which is axially coupled to a reel 144. A cable 146 or the like is attached at one end to reel 144 and is wrapped about reel 144. Cable 146 is attached at the other end to Z ram 38. As Z ram 38 travels up and down in a Z direction, cable 146 is uncoiled and coiled up respectively on reel 144. Rotation of reel 144 coils or uncoils spring 142 which is calibrated to provide an upward force on Z ram 38 in the Z direction or away from table 20 which at all times closely equals the gravitational force on Z ram 38 thereby rendering Z ram 38 substantially weightless.

Carriage 36 also includes a drive motor 150, such as a servo-motor, which is coupled to a pinion gear or the like which engages drive 54 to move carriage 36 back and forth in an X direction. Carriage 36 also includes a second drive motor 160 mounted thereon which is coupled to another pinion gear or the like and which moves Z ram 38 up and down in a Z or vertical direction such as by engagement with rack 84 on Z ram 38. These systems are all conventional and are well-known to one of ordinary skill in the art, and, therefore need not be described further.

Base 120 typically is formed of a material that is different from that of beam 80, and parallel rails 50. As a result, changes in the ambient temperature surrounding machine 10 could produce differential expansion or contraction of base 120 of carriage 36 with respect to beam 80 and its associated rails 50. Any differential expansion or contraction of base 120 in the X direction likely would not cause any significant measurement error and therefore need not be accommodated, or compensated for. However, any differential expansion or contraction of base 120 with respect to beam 80 and/or rails 50 in the Y direction, or perpendicular to the direction of elongation of rails 50 and beam 80, could produce binding of slides 121 and 122 which could slow the movement of carriage 36, or could even cause damage to slides 121 and 122 or rails 50. All of these problems could produce unacceptable errors in the measurement process and/or significantly slow the measurement process. To avoid such errors and/or to avoid damage to machine 10, it is desirable to be able to accommodate the expansion and contraction of base 120 which occur with changes in temperature in a normal shop environment.

To accommodate such expansion and contraction, a flexible coupling 124 is provided between base 120 and at least one set of slides 122 which ride on one of rails 50. In one embodiment, this flexible coupling 124 may include a leaf spring 126. Leaf spring 126 typically is sufficiently strong to support carriage 36 on slides 122 in a Z-direction, but is sufficiently flexible to accommodate the foregoing expansion and contraction of base 120 in the Y direction. Typically, leaf spring 126 is mounted along an upper edge 127 to base 120, such as by a block 128 or the like which may be secured by a bracket 130, using screws, bolts, rivets or other known fasteners 131. An opposed or lower edge 129 of leaf spring 126 may be mounted directly to associated slides 122 such as by blocks 132 with the use of screws, rivets, bolts, glue or other known fasteners 133. Typically, but not necessarily, base 120 does not rest directly on slides 122, but is spaced above slides 122 and supported only by leaf spring 126. In this way, leaf spring 126 is free to flex in the Y direction to accommodate expansion and contraction of base 120 without frictional interference caused by rubbing of base 120 against other components, such as slides 122. Leaf spring may be formed of spring steel and have a thickness of about 1 mm and a size of about 110 mm by 63 mm, although other material, sizes and thicknesses may be used.

Another portion of carriage 36, such as the front edge of carriage 36, may be mounted directly to slides 121 in any known fashion such as by screws or the like. Slides 121 ride along the other of rails 50 than the rail upon which slides 122 slide. It is to be understood, however, that a coupling 124 may also be used to join carriage 36 to slides 121. Alternatively, carriage 36 may be joined directly to slides 122 without coupling 124 and coupling 124 could only be used with slides 121.

The foregoing aspects of this invention allow a machine having an element such as a carriage moving along a rail or rails, such as a coordinate measuring machine, to operate in varying temperature conditions while maintaining a high level of accuracy, without having to sacrifice or compromise on strength, speed, light-weight structure and practical affordability.

Having thus described several aspects of at least one embodiment of this invention, it is to be appreciated that various alterations, modifications and improvements will readily occur to those skilled in the art. Such alterations, modifications and improvements are intended to be part of this disclosure, and are within the spirit and scope of the invention. Accordingly, the description and drawings are by way of example only. The invention is intended to be limited only by the following claims and their equivalents.

What is claimed is:

1. A machine comprising:
   a movable machine component;
   a rail along which said machine component is permitted to move in a first generally linear direction and on which said machine component rests;
   a support for supporting said rail;
   a first coupling between said rail and said support; and
   a second coupling between said rail and said support, said second coupling being flexible in a direction generally parallel to said first direction to permit movement of said rail with respect to said support in said first direction but being generally rigid in directions generally perpendicular to said first direction to minimize movement of said rail in said directions generally perpendicular to said first direction with respect to said support and to maintain said rail in a generally fixed relationship with respect to said support in said directions generally perpendicular to said first direction.

2. The machine as recited in claim 1, wherein said first coupling is generally rigid to prevent any substantial movement of said rail with respect to said support.

3. The machine as recited in claim 1, further comprising a beam between said rail and said support to which said rail is affixed, said first and second couplings being attached to said beam, said beam having substantially the same coefficient of thermal expansion as said rail.

4. The machine as recited in claim 1, wherein said second coupling comprises a leaf spring and wherein one face of said leaf spring is substantially planar, and wherein said planar face of said leaf spring is oriented in a direction generally perpendicular to said first direction.

5. The machine as recited in claim 4, wherein said leaf spring is coupled to said support and said rail.

6. The machine as recited in claim 1, further comprising:
   a second rail along which said machine component is permitted to move and on which said machine component rests;
   a second support for supporting said second rail;
   a third coupling between said second rail and said second support; and
   a fourth coupling disposed between said second rail and said second support, said second coupling being flexible in a direction generally parallel to said first direction to permit movement of said second rail with respect to said second support in said first direction but being generally rigid in directions generally perpendicular to said first direction to minimize movement of said second rail in said directions generally perpendicular to said first direction and to maintain said second rail in a fixed relationship with respect to said second support in said directions generally perpendicular to said first direction.

7. The machine as recited in claim 1, wherein said machine is a coordinate measuring machine.

8. A method of accommodating differential thermal expansion and contraction between a rail and upon which a machine component rides and a support for supporting the rail, wherein the rail extends in a first generally linear direction to allow movement of the machine component in the first direction, the method comprising:
   attaching the rail to the support at one location using a first coupling; and
   attaching the rail to the support at a second location spaced from the first location using a second coupling that is flexible in a direction generally parallel to the first direction, the second coupling being generally rigid in directions generally perpendicular to the first direction to maintain a substantially fixed relationship between the rail and the support in the directions generally perpendicular to the first direction.

9. The method as recited in claim 8, further comprising rigidly coupling the rail to the support at the first coupling to prevent any substantial movement of the rail with respect to the support at the first location.

10. The method as recited in claim 8, further comprising the step of mounting the rail to a beam having a coefficient of thermal expansion substantially the same as the coefficient of thermal expansion of the rail and mounting the first and second couplings to the beam.

* * * * *